US012619461B2

(12) United States Patent
Shi et al.

(10) Patent No.: US 12,619,461 B2
(45) Date of Patent: May 5, 2026

(54) GRAPHICS PROCESSING UNIT PERFORMANCE ANALYSIS METHOD, COMPUTER DEVICE AND STORAGE MEDIUM

(71) Applicant: Glenfly Tech Co., Ltd., Shanghai (CN)

(72) Inventors: Bojun Shi, Shanghai (CN); Zeqin Zhou, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 436 days.

(21) Appl. No.: 18/240,168

(22) Filed: Aug. 30, 2023

(65) Prior Publication Data

US 2024/0211307 A1     Jun. 27, 2024

(30) Foreign Application Priority Data

Dec. 22, 2022     (CN) .......................... 202211655864.8

(51) Int. Cl.
| | | |
|---|---|---|
| *G06F 3/00* | (2006.01) | |
| *G06F 9/38* | (2018.01) | |
| *G06F 9/48* | (2006.01) | |

(52) U.S. Cl.
CPC .......... *G06F 9/4881* (2013.01); *G06F 9/3877* (2013.01)

(58) Field of Classification Search
CPC ....................................................... G06F 9/48
See application file for complete search history.

(56) References Cited

U.S. PATENT DOCUMENTS

| | | | |
|---|---|---|---|
| 10,163,500 B1* | 12/2018 | Yu ........................ | G06F 11/1072 |
| 2014/0176586 A1* | 6/2014 | Gruber ................ | G06F 12/0607 |
| | | | 345/533 |
| 2015/0097844 A1 | 4/2015 | Wankhede et al. | |
| 2016/0328272 A1* | 11/2016 | Ahmed ................. | G06F 9/4881 |

(Continued)

FOREIGN PATENT DOCUMENTS

| | | |
|---|---|---|
| CN | 111831410 A | 10/2020 |
| CN | 112506637 A | 3/2021 |
| CN | 113778694 A | 12/2021 |

OTHER PUBLICATIONS

Fiaz Gul Khan, Analysis of Fast Parallel Sorting Algorithms for GPU Architectures. (Year: 2011).*

(Continued)

*Primary Examiner* — Lechi Truong
(74) *Attorney, Agent, or Firm* — NIXON PEABODY LLP

(57) ABSTRACT

The present application relates to a graphics processing unit (GPU) performance analysis method and a computer device, and a storage medium. The method includes: submitting a GPU task queue generated by a central processing unit (CPU) to a GPU; the GPU task queue including a plurality of GPU tasks sorted by processing start moments, each of the GPU tasks being configured with respective access addresses of a plurality of storage spaces required to be accessed when the GPU task is processed; processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure.

11 Claims, 12 Drawing Sheets

| Submit a GPU task queue generated by a CPU to a GPU; the GPU task queue includes a plurality of GPU tasks sorted by processing start moments, each of the GPU tasks si configured with respective access addresses of a plurality of storage spaces required to be accessed when the GPU task is processed | S202 |

| Process the plurality of GPU tasks through the GPU according to a processing time sequence of each GPU task in the task queue | S204 |

| Acquire, for a memory access procedure required in a GPU task processing procedure, execution performance reference information of the GPU and/or the CPU for each GPU task according to access time information generated by the CPU and the GPU for the memory access procedure | S206 |

(56) References Cited

U.S. PATENT DOCUMENTS

| | | | |
|---|---|---|---|
| 2017/0004019 A1* | 1/2017 | Hui | G06F 9/5083 |
| 2020/0012521 A1* | 1/2020 | Wu | G06N 3/04 |
| 2020/0090001 A1* | 3/2020 | Zargahi | G06V 10/96 |

OTHER PUBLICATIONS

Chinese Office Action for App. No. 202211655864.8, mailed Nov. 10, 2023 (11 pages).

* cited by examiner

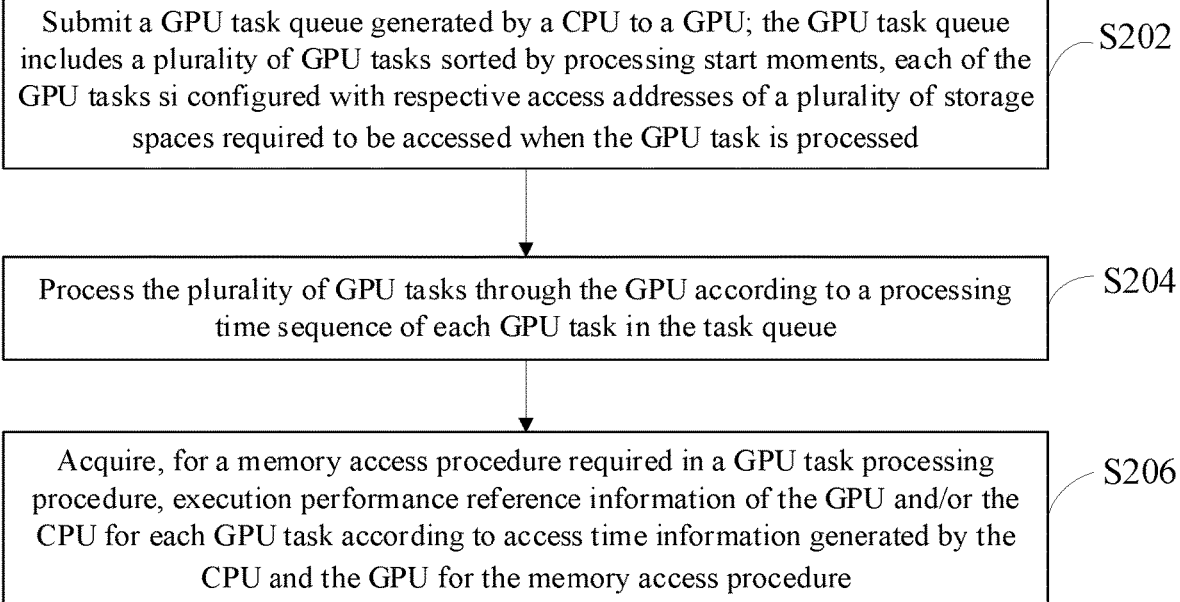

Submit a GPU task queue generated by a CPU to a GPU; the GPU task queue includes a plurality of GPU tasks sorted by processing start moments, each of the GPU tasks si configured with respective access addresses of a plurality of storage spaces required to be accessed when the GPU task is processed    S202

Process the plurality of GPU tasks through the GPU according to a processing time sequence of each GPU task in the task queue    S204

Acquire, for a memory access procedure required in a GPU task processing procedure, execution performance reference information of the GPU and/or the CPU for each GPU task according to access time information generated by the CPU and the GPU for the memory access procedure    S206

FIG. 2

Process, through the task start event, the GPU task corresponding to a task start event according to the processing time sequence of each GPU task in the task queue, and access, through the GPU access event, the storage space required to be accessed in the GPU task processing procedure          ⌐S602

End the processing procedure of the GPU task through a task end event          ⌐S604

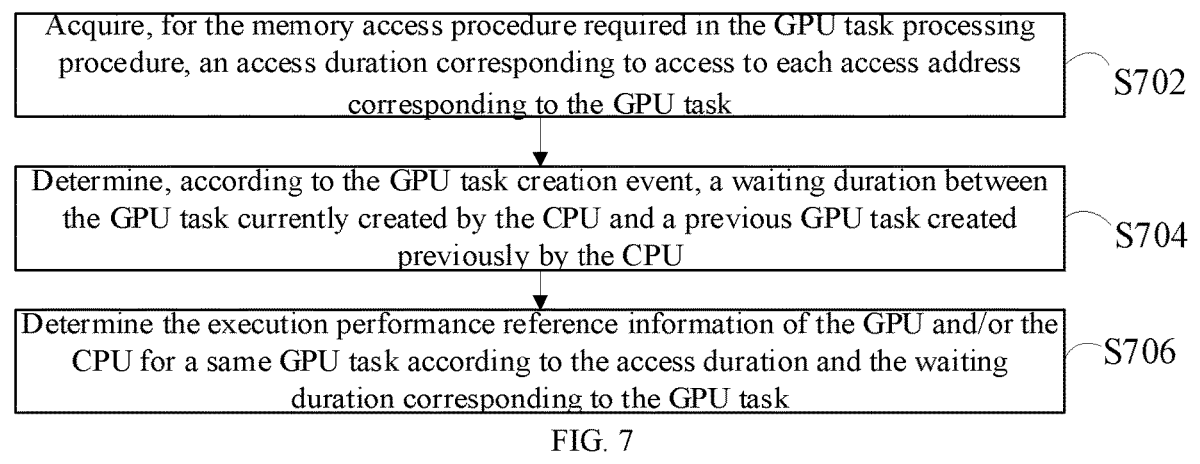

| Acquire, for the memory access procedure required in the GPU task processing procedure, an access duration corresponding to access to each access address corresponding to the GPU task | S702 |

| Determine, according to the GPU task creation event, a waiting duration between the GPU task currently created by the CPU and a previous GPU task created previously by the CPU | S704 |

| Determine the execution performance reference information of the GPU and/or the CPU for a same GPU task according to the access duration and the waiting duration corresponding to the GPU task | S706 |

FIG. 7

GRAPHICS PROCESSING UNIT PERFORMANCE ANALYSIS METHOD, COMPUTER DEVICE AND STORAGE MEDIUM

CROSS REFERENCE TO RELATED APPLICATIONS

This application claims all benefits accruing under 35 U.S.C. § 119 to Chinese Patent Applications No. 2022116558648 filed on Dec. 22, 2022 in the China National Intellectual Property Administration, the content of which is hereby incorporated by reference.

TECHNICAL FIELD

The present application relates to the field of graphics processing unit (GPU) performance tuning technologies, and in particular, to a GPU performance analysis method and apparatus, a computer device, and a storage medium.

BACKGROUND

Modern desktop operating systems rely extensively on GPUs for acceleration. The GPUs are applicable to fields such as 3D graphics acceleration, video encoding and decoding, high-performance parallel computing, and display output. Performance analysis and optimization of a GPU is an important aspect of development of a graphics application. Hardware and software performance bottlenecks are found by analyzing actual operation of the GPU, and a driver is adjusted and optimized to maximize performance of hardware of the GPU.

In conventional technologies, in order to find a root cause of a GPU performance problem, there is typically a need to understand an overall behavior of the graphics application and a graphics system and to optimize the driver as a whole to avoid the bottlenecks. However, source code of the graphics application may be unavailable, and architectures of graphics systems of different operating systems may be different, resulting in incapability to analyze the overall behavior of the graphics application and the graphics system and incapability to acquire accurate GPU performance data.

SUMMARY

Based on this, there is a need to provide, with respect to the above technical problems, a GPU performance analysis method and apparatus, a computer device, and a storage medium that can analyze performance of a GPU from an overall behavior of a central processing unit (CPU) and the GPU without the source code of the graphics application.

In a first aspect, the present application provides a GPU performance analysis method. The method includes:

submitting a GPU task queue generated by a CPU to a GPU; the GPU task queue including a plurality of GPU tasks sorted by processing start moments, each of the GPU tasks being configured with respective access addresses of a plurality of storage spaces required to be accessed when the GPU task is processed;

processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure.

In an embodiment, the submitting the GPU task queue generated by the CPU to the GPU includes:

creating the plurality of GPU tasks according to a plurality of GPU task creation events, and forming the GPU task queue according to the plurality of GPU tasks;

configuring, through a GPU access event, an access address of a storage space required to be accessed when each GPU task is processed; and submitting the GPU task queue to the GPU through a GPU task submission event.

In an embodiment, the processing the plurality of GPU tasks through the GPU according to the processing time sequence of each GPU task in the task queue includes:

processing, through the task start event, the GPU task corresponding to a task start event according to the processing time sequence of each GPU task in the task queue, and accessing, through the GPU access event, the storage space required to be accessed in the GPU task processing procedure; and ending the processing procedure of the GPU task through a task end event.

In an embodiment, the acquiring, for the memory access procedure required in the GPU task processing procedure, execution performance reference information of the GPU and/or the CPU for each GPU task according to access time information generated by the CPU and the GPU for the memory access procedure includes:

acquiring, for the memory access procedure required in the GPU task processing procedure, an access duration corresponding to access to each access address corresponding to the GPU task;

determining, according to the GPU task creation event, a waiting duration between the GPU task currently created by the CPU and a previous GPU task created previously by the CPU; and determining the execution performance reference information of the GPU and/or the CPU for a same GPU task according to the access duration and the waiting duration corresponding to the GPU task.

In an embodiment, the determining the execution performance reference information of the GPU and/or the CPU for the same GPU task according to the access duration and the waiting duration corresponding to the GPU task includes:

determining the execution performance reference information of the GPU for the same GPU task if the access duration corresponding to the GPU task exceeds a preset access duration and the waiting duration corresponding to the GPU task does not exceed a preset creation duration; and determining the execution performance reference information of the GPU for the same GPU task if the access duration corresponding to the GPU task does not exceed the preset access duration and the waiting duration corresponding to the GPU task exceeds the preset creation duration.

In an embodiment, the method further includes: drawing the GPU task creation event, the access event, the task start event, and the task end event corresponding to each GPU task in a same flowchart according to a processing time sequence; a horizontal axis of the flow chart indicates the time sequence, and a vertical axis indicates a thread number of the CPU.

In an embodiment, the drawing the GPU task creation event, the access event, the task start event, and the task end event corresponding to each GPU task in the same flowchart according to the processing time sequence includes:

sorting the GPU task creation event, the access event, the task start event, and the task end event corresponding to each GPU task in order of processing time, and selecting an event sorted first as a current event and a target thread where the current event is located;

if the current event is the access event, adding a memory access node to a corresponding position of the target thread in the flowchart, connecting the memory access node to a last access node in a target storage space corresponding to the access event, and taking the current memory access node as the last access node in the target storage space; and adding an access address of the target storage space corresponding to the current event to an access event of a last GPU task of the target thread, and selecting next event as the current event;

if the current event is the GPU task creation event, marking a GPU task corresponding to the current event as the last GPU task of the target thread, and selecting next event as the current event; and if the current event is the task end event, adding, to the flowchart, a rectangular box corresponding to an access time period during which the GPU task corresponding to the current event accesses the target storage space, connecting the rectangular box to the access node of the target storage space, and selecting next event as the current event.

In a second aspect, the present application provides a GPU performance analysis apparatus. The apparatus includes:

a GPU task submission module configured to submit a GPU task queue generated by a CPU to a GPU; the GPU task queue including a plurality of GPU tasks sorted by processing start moments, each of the GPU tasks being configured with respective access addresses of a plurality of storage spaces required to be accessed when the GPU task is processed;

a GPU task processing module configured to process the plurality of GPU tasks through the GPU according to a processing time sequence of each GPU task in the task queue; and a performance analysis module configured to acquire, for a memory access procedure required in a GPU task processing procedure, execution performance reference information of the GPU and/or the CPU for each GPU task according to access time information generated by the CPU and the GPU for the memory access procedure.

In a third aspect, the present application further provides a computer device. The computer device includes a memory and a processor, the memory storing a computer program, wherein the processor, when executing the computer program, implements the following steps:

submitting a GPU task queue generated by a CPU to a GPU; the GPU task queue including a plurality of GPU tasks sorted by processing start moments, each of the GPU tasks being configured with respective access addresses of a plurality of storage spaces required to be accessed when the GPU task is processed;

processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure.

In a fourth aspect, the present application further provides a computer-readable storage medium. The computer-readable storage medium stores a computer program, wherein, when the computer program is executed by a processor, the following steps are implemented:

submitting a GPU task queue generated by a CPU to a GPU; the GPU task queue including a plurality of GPU tasks sorted by processing start moments, each of the GPU tasks being configured with respective access addresses of a plurality of storage spaces required to be accessed when the GPU task is processed;

processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure.

In a fifth aspect, the present application further provides a computer program product. The computer program product includes a computer program, wherein, when the computer program is executed by a processor, the following steps are implemented:

submitting a GPU task queue generated by a CPU to a GPU; the GPU task queue including a plurality of GPU tasks sorted by processing start moments, each of the GPU tasks being configured with respective access addresses of a plurality of storage spaces required to be accessed when the GPU task is processed;

processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure.

According to the above GPU performance analysis method and apparatus, the computer device, and the storage medium described above, for the memory access procedure required in the GPU task processing procedure, execution performance reference information of the GPU and/or the CPU for each GPU task is acquired according to access time information generated by the CPU and the GPU for the memory access procedure. According to the above method, while execution of the GPU task by the CPU and the GPU is analyzed at the same time, transfer processes of the GPU task queue and GPU graphics data are combined with processing flows of the graphics data between processes to comprehensively analyze the overall behavior of the graphics application and the graphics system, which optimizes the graphics application as a whole, improves performance of the GPU, and analyzes a graphics behavior of the graphics application without the source code of the graphics application.

BRIEF DESCRIPTION OF THE DRAWINGS

FIG. 2 is a schematic flowchart of the GPU performance analysis method according to an embodiment;

FIG. 7 is a schematic flowchart of acquiring execution performance reference information of the GPU and/or the CPU for each GPU task according to an embodiment;

DETAILED DESCRIPTION OF THE EMBODIMENTS

In order to make the above objectives, technical solutions, and advantages of the present application more obvious and understandable, the present application is described in detail below with reference to the accompanying drawings and embodiments. It should be understood that specific embodiments described herein are intended only to explain the present application, and are not intended to limit the present application.

Figure 1:
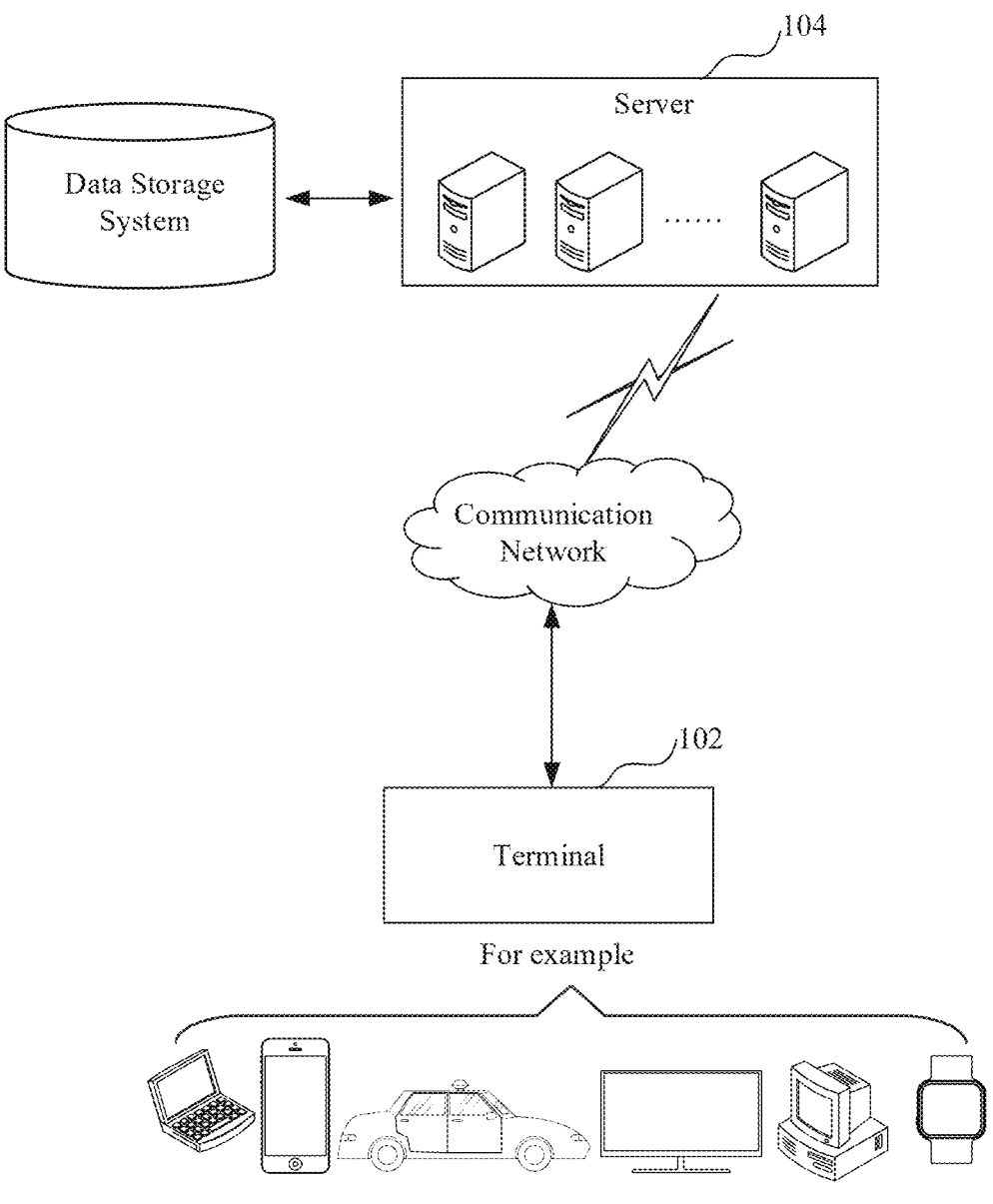
FIG. 1 is a diagram of an application environment of a GPU performance analysis method according to an embodiment.

A GPU performance analysis method according to an embodiment of the present application is applicable to an application environment shown in FIG. 1. A terminal 102 submits a GPU task queue generated by a CPU to a GPU; the GPU task queue includes a plurality of GPU tasks sorted by processing start moments; each of the GPU tasks is configured with respective access addresses of a plurality of storage spaces required to be accessed when the GPU task is processed; processes the plurality of GPU tasks through the GPU according to a processing time sequence of each GPU task in the task queue; and acquires, for a memory access procedure required in a GPU task processing procedure, execution performance reference information of the GPU and/or the CPU for each GPU task according to access time information generated by the CPU and the GPU for the memory access procedure. The terminal 102 communicates with a server 104 over a network. A data storage system may store the respective access addresses of the plurality of storage spaces required to be accessed when the GPU task is processed. The data storage system may be integrated on the server 104, or placed on a cloud or other network servers. The terminal 102 may be, but is not limited to, various personal computers, laptop computers, smart phones, tablet computers, Internet of Things devices, and portable wearable devices. The Internet of Things devices may be smart TVs, smart vehicle-mounted devices, or the like. The portable wearable devices may be smart watches, smart bracelets, headset devices, or the like. The server 104 may be implemented by a standalone server or a server cluster formed by a plurality of servers.

In an embodiment, as shown in FIG. 2, a GPU performance analysis method is provided. For example, the method is applicable to the terminal shown in FIG. 1, including the following steps.

In step 202, a GPU task queue generated by a CPU is submitted to a GPU; the GPU task queue includes a plurality of GPU tasks sorted by processing start moments, each of the GPU tasks is configured with respective access addresses of a plurality of storage spaces required to be accessed when the GPU task is processed.

Figure 3:
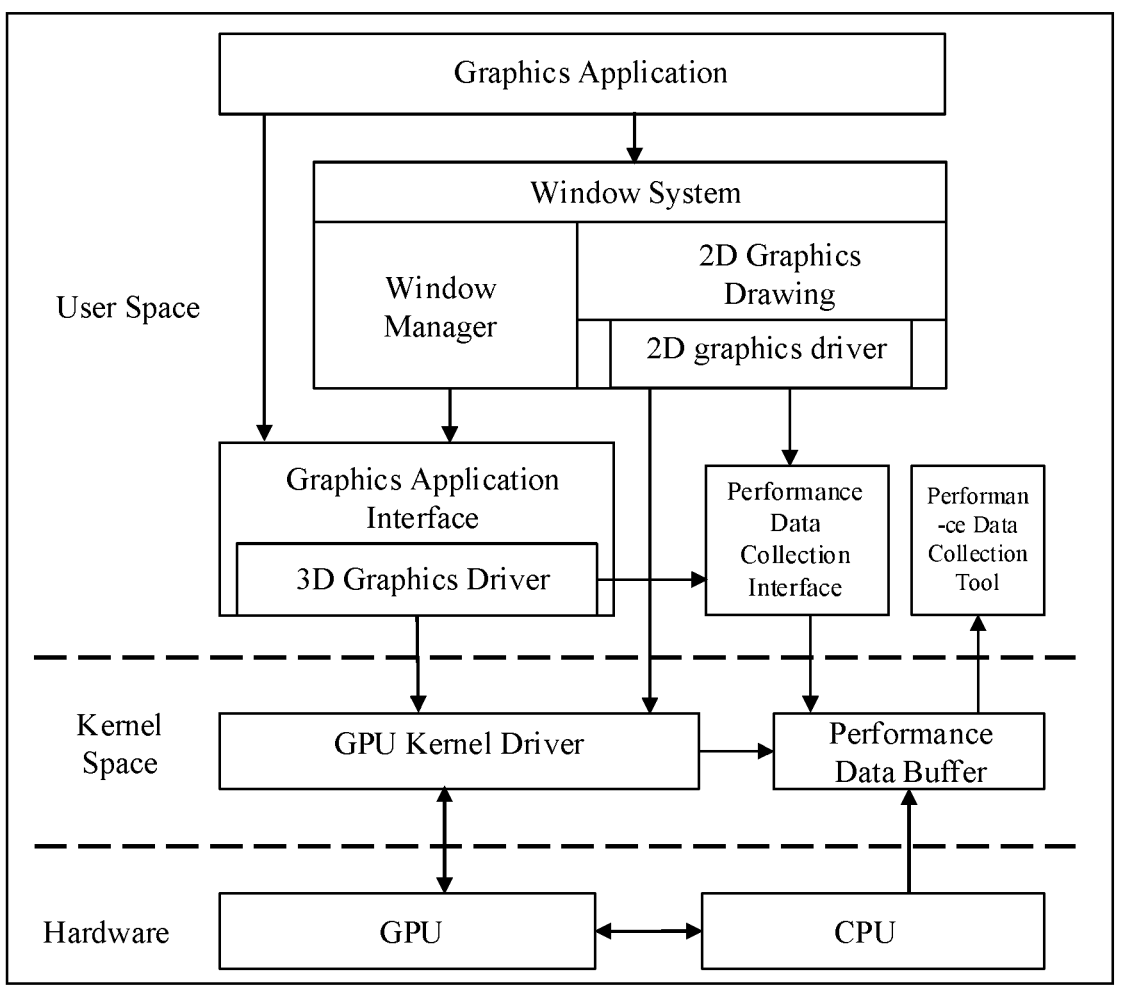
FIG. 3 is a schematic diagram of a framework of a graphics system according to an embodiment.

A hierarchical framework of a graphics system is shown in FIG. 3. A GPU, a GPU kernel driver, a 3D graphics driver, a 2D graphics driver, and a performance data collection interface shown in FIG. 3 belong to hardware and software parts of the GPU, and the rest shown in FIG. 3 belong to components other than the graphics system or the GPU. A graphics driver includes the GPU kernel driver, the 3D graphics driver, and the 2D graphics driver. The graphics driver dynamically divides a graphics memory of the GPU into a plurality of storage spaces. Various graphics data used in a drawing process of the GPU is stored in the plurality of storage spaces. The graphics driver may assign a unique identifier to each storage space, and collect and record events related to access to the storage space during operation to generate performance data. Generally, a graphics application is called through a graphics application interface, and then the graphics driver is called, but the graphics application interface is to be called by the CPU, which is asynchronous with respect to actual execution of the GPU. Therefore, in order to find a root cause of a performance problem, there is typically a need to understand an overall behavior of the graphics application and the graphics system and to optimize the driver as a whole to avoid the bottlenecks.

Due to complexity of a desktop graphics system framework, completion from drawing to display generally requires cooperation between a plurality of software and hardware modules, such as interaction between the graphics application and a process of a graphics system service and interaction between the CPU and the GPU. At the same time, there are a plurality of modules executed parallelly inside the GPU. Therefore, in addition to the performance of the GPU, the graphics driver allocates resources of the GPU reasonably, which may also have an important influence on graphics performance. Hardware and software performance bottlenecks are found by analyzing actual operation of the GPU, and a driver is adjusted and optimized to maximize the performance of the GPU. Therefore, in this embodiment, access to memory data is analyzed, and interaction among the graphics application, the graphics system service, the graphics driver, and the GPU can be understood, thereby reflecting behaviors of the entire graphics system.

When the CPU uses the GPU for drawing by calling the graphics application interface, the graphics driver may generate a plurality of GPU tasks according to a request of the graphics application. The GPU tasks form a GPU task queue and are submitted to the GPU. For each GPU task, a GPU task creation event for generating the GPU task and a GPU task submission event for submitting the GPU task to the GPU may be recorded. The respective access addresses of the plurality of storage spaces required to be accessed when the GPU task is processed may also be recorded between the GPU task creation event and the GPU task submission event. A GPU access event may be recorded for the access address of each storage space required to be accessed when the GPU task is processed. The GPU access event indicates that the graphics driver sends a request to access an access address of a specified storage space, and the GPU is required to access the access address of the specified storage space, but actual access is required to be performed by the GPU, because the GPU accesses the specified storage space asynchronously with the CPU.

Optionally, the terminal, through the CPU and according to the request of the graphics driver, calls the graphics application through the graphics application interface and then calls the graphics driver, and the graphics driver generates a plurality of GPU tasks according to the request of the graphics application. The GPU tasks form a GPU task queue and are submitted to the GPU.

In step 204, the plurality of GPU tasks are processed through the GPU according to a processing time sequence of each GPU task in the task queue.

After the graphics driver submits the GPU task to the GPU, the GPU may actually access the specified storage space when executing the GPU task. by recording an execution start moment and an execution end moment of the GPU task on the GPU, respective access start moments and access end moments required to access the plurality of storage spaces when the GPU task is processed can be acquired.

For a CPU thread that generates a GPU task, GPU access events between the GPU task creation event and the GPU task submission event all belong to the GPU task. Through this correspondence, the request of the graphics driver can be associated with actual access of the GPU to each storage space required to be accessed when the GPU task is processed.

Optionally, the terminal, after submitting the GPU tasks to the GPU through the graphics driver, processes each GPU task in the task queue according to a processing time sequence of the GPU task through the GPU, and during processing of the GPU task, through a plurality of GPU access events corresponding to the GPU task, accesses access addresses of storage spaces specified by the GPU access events, and records access start moments and access end moments of the specified storage spaces.

In step 206, for a memory access procedure required in a GPU task processing procedure, execution performance reference information of the GPU and/or the CPU for each GPU task is acquired according to access time information generated by the CPU and the GPU for the memory access procedure.

The access time information refers to the access start moments and the access end moments of the storage spaces during access to the respective access addresses of the plurality of storage spaces when the GPU task is processed, and creation start moments corresponding to the GPU tasks created by the CPU. The execution performance reference information refers to an impact factor for reflecting a parameter affecting performance of the CPU and/or the GPU, which may be, for example, a function execution period and a waiting period of the current CPU, or an execution period and scheduling of the GPU task of the GPU.

Figure 4:
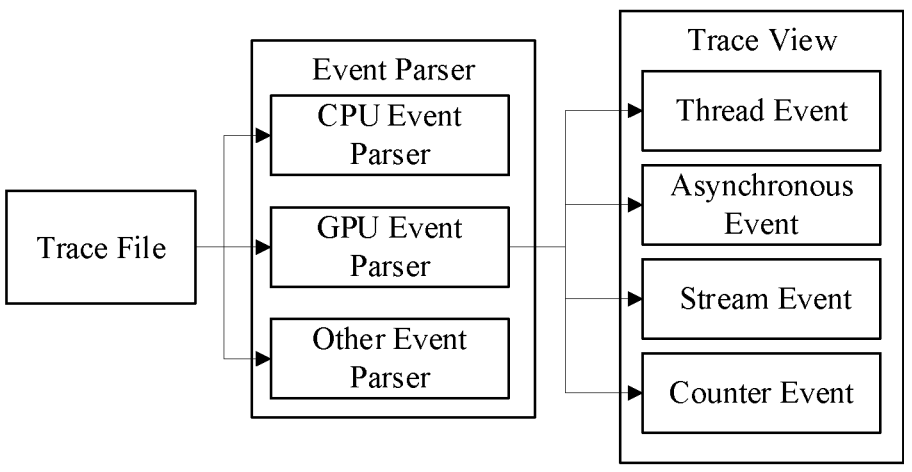
FIG. 4 is a schematic diagram of classification of events in a trace file according to another embodiment.

In order to analyze performance of the graphics system, there is firstly a need to acquire performance data from the graphics system. All performance data is stored in a performance data buffer shown in FIG. 3. A performance analysis tool acquires the performance data from the performance data buffer, and the performance analysis tool may be run at a local machine or at a remote machine. The performance data is stored in a trace file for subsequent performance analysis. During the performance analysis, the trace file is opened to parse the performance data therein, and the performance data is displayed in a trace view. Events in the trace file are classified as shown in FIG. 4. Event types after event parsing include a thread event, an asynchronous event, a stream event, and a counter event.

For specific GPU hardware, performance parameters thereof are fixed. In this embodiment, after a behavior of the graphics system is analyzed, optimization may generally be performed from the following several aspects to achieve a purpose of improving performance.

1) The graphics application may be optimized. For example, a graphics format better suitable for processing by the GPU (instead of being better suitable for processing by the CPU) may be selected, or data may be compressed to reduce transmission time, or the like.

2) If there is a dependency between GPU tasks (one task should be executed only after another task is completed), an order of tasks submitted to the GPU can be optimized to reduce waiting time.

3) If a bottleneck affecting performance of the GPU lies in a specific GPU task, a task algorithm may be optimized.

4) If there is room for optimization of an application or an operating system, an optimization suggestion may be provided to the collaborators.

Optionally, in the memory access procedure required in the GPU task processing procedure, the terminal acquires an execution period and a waiting period for the CPU calling the graphics driver to generate a GPU access event, and an access start moment and an access end moment corresponding to access to an access address of a storage space specified by the GPU access event when the GPU executes the GPU task corresponding to the GPU access event. The terminal obtains the execution performance reference information of the GPU for each GPU task according to the execution period and the waiting period for the CPU calling the graphics driver to generate the GPU access event and the access start moment and the access end moment corresponding to access of the CPU to the access address of the storage space specified by the GPU access event.

In the above GPU performance analysis method, execution of the GPU task by the CPU and the GPU, in combination with transfer processes of the GPU task queue and GPU graphics data and processing flows of the graphics data between processes are analyzed, so as to comprehensively analyze the overall behavior of the graphics application and the graphics system, which optimizes the graphics application as a whole, improves performance of the GPU, and analyzes a graphics behavior of the graphics application without the source code of the graphics application.

Figure 5:
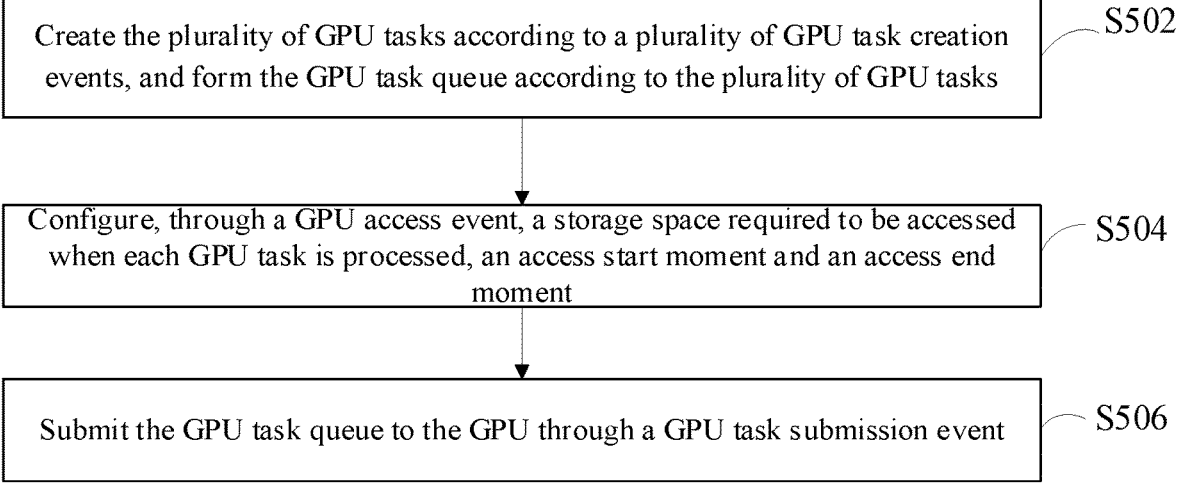
FIG. 5 is a schematic flowchart of submitting a GPU task queue generated by a CPU to a GPU according to an embodiment.

In an embodiment, as shown in FIG. 5, the submitting a GPU task queue generated by a CPU to a GPU includes the following steps.

In step 502, the plurality of GPU tasks are created according to a plurality of GPU task creation events, and the GPU task queue is formed by the plurality of GPU tasks.

The GPU task creation event indicates that the graphics driver sends a request to create a GPU task, and the CPU is required to generate the GPU task. A GPU task creation event is used to create a GPU task, a GPU task is processed by a CPU thread, and each GPU task corresponds to a same CPU thread or different CPU threads. That is, a CPU thread may also generate a plurality of GPU tasks. When each GPU task is processed, respective access addresses of a plurality of storage spaces required to be accessed are not exactly the same. Therefore, a flow direction of the graphics data between processes can be obtained by analyzing execution of the GPU task by the CPU and the GPU.

Optionally, the terminal creates the plurality of GPU tasks according to a plurality of GPU task creation events through the GPU task creation events generated by the CPU. The plurality of GPU tasks are sorted according to a processing time sequence, to obtain the GPU task queue formed by the plurality of GPU tasks.

In step 504, an access address of a storage space required to be accessed when each GPU task is processed is configured through a GPU access event.

The GPU access event indicates that the graphics driver sends a request to access an access address of a specified storage space, and the GPU is required to access the access address of the specified storage space. The GPU access event includes the access address of the specified storage space required to be accessed by the GPU and an access type. The access type includes read and write.

Optionally, the terminal generates the GPU access event according to the fact that the graphics driver has sent the request to access the access address of the specified storage space. The terminal configures, according to the GPU access event, the access address of the storage space required to be accessed when each GPU task is processed.

In step 506, the GPU task queue is submitted to the GPU through a GPU task submission event.

The GPU task submission event indicates that the graphics driver sends a request to submit the GPU tasks to the GPU.

In addition to recording information of the events, the GPU task creation event, the GPU access event, and the GPU task submission event described above are also required to record timestamps when the events occur and CPU threads where the events are located. The events are classified according to the CPU threads and then analyzed, and an interactive relationship between the threads can be generated.

In this embodiment, the GPU tasks are created through the GPU task creation event, and according to the GPU access event, each GPU task is configured with the access address of the storage space required to be accessed when the GPU task is processed. A flow direction of same graphics data in the GPU task creation event, the GPU access event, and the GPU task submission event is analyzed, thread interaction between the CPU and the GPU can be obtained, and behaviors of the CPU and the GPU are associated to analyze an overall behavior of the graphics system, which can improve the performance of the GPU.

Figure 6:
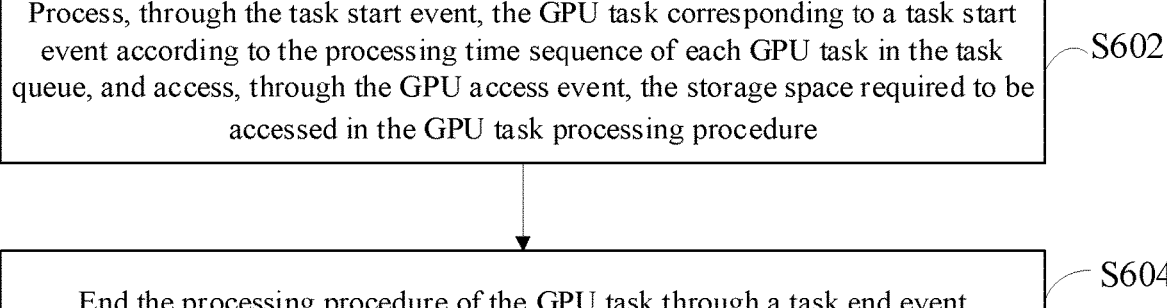
FIG. 6 is a schematic flowchart of processing, by the GPU, a plurality of GPU tasks according to an embodiment.

In an embodiment, as shown in FIG. 6, the processing the plurality of GPU tasks through the GPU according to a processing time sequence of each GPU task in the task queue includes the following steps.

In step 602, the GPU task corresponding to a task start event is processed according to the processing time sequence of each GPU task in the task queue through the task start event, and the storage space required to be accessed in the GPU task processing procedure is accessed through the GPU access event.

The task start event indicates that the GPU starts a request to execute the GPU task, and the task start event includes a start moment at which the GPU task is processed. During the execution of the GPU task, the storage space required to be accessed in the GPU task processing procedure is accessed according to a plurality of access events corresponding to the GPU task. It is to be noted that other processing flows are further included when the GPU task is executed. Therefore, a duration required to process the GPU task is longer than or equal to a duration required for the access event. For example, the GPU task corresponds to three access events. Each access event indicates access to a different storage space. When the GPU processes the GPU task according to the task start event, the time to access the memory and a sequence of other flows (mainly calculation) are uncertain, which may also be performed at the same time and is required to be determined according to a specific situation of each task. Therefore, in this embodiment, specific access flows are not distinguished, and it is assumed that, within start and end time of the GPU task, the GPU continuously accesses a plurality of memories corresponding to the GPU task and records access start moments and access end moments of access to the storage spaces. For example, assuming that a GPU task is required to access three memories A, B, and C, there are at least the following several access orders for the three memories: read A and write C within T0-T1, and read B and write C within T1-T2; read A and write B within T0-T1, and read B and write C within T1-T2; read A and write B within T0-T1, and read A and write C within T1-T2. In this embodiment, specific access flows are not distinguished, and it is assumed that, within start and end time (T0-T2) of the GPU task, the GPU continuously accesses the three memories.

In step 604, the processing procedure of the GPU task is ended through a task end event.

The task end event indicates the GPU ends the request to execute the GPU task, and a moment at which execution of the GPU task is ended is recorded in the task end event. It is to be noted that a time period between the task start event and the task end event includes time periods required for the access events when the GPU task is processed.

Optionally, when the GPU executes the GPU task, if an execution moment reaches the moment at which execution of the GPU task is ended recorded in the task end event, the terminal ends the GPU task at the moment at which execution of the GPU task is ended.

In this embodiment, in the memory access procedure required in the GPU task processing procedure, the access duration corresponding to each access address corresponding to the GPU task is acquired, and a parameter affecting the performance of the GPU can be obtained by analysis according to the access duration.

In an example, the execution performance reference information that affects the performance of the GPU is analyzed only from the perspective of the GPU, only execution time of each specific GPU task can be determined, and only the specific GPU task can be analyzed and optimized. Therefore, in order to solve the above problem, in this embodiment, an entire flow from the CPU creating a GPU task to the GPU executing the GPU task is analyzed, an overall access situation of access to a target storage space by the GPU task is acquired, and a behavior of the entire system is obtained, so as to select an optimal processing manner, which even can change feedback of the graphics driver to requests of the system and the graphics application, thereby changing behaviors of the system and the graphics application and further changing behaviors of the GPU and the CPU. Specifically, as shown in FIG. 7, the acquiring, for a memory access procedure required in a GPU task processing procedure, execution performance reference information of the GPU and/or the CPU for each GPU task according to access time information generated by the CPU and the GPU for the memory access procedure includes the following steps.

In step 702, an access duration corresponding to access to each access address corresponding to the GPU task is acquired for the memory access procedure required in the GPU task processing procedure.

The memory access procedure required in the GPU task processing procedure refers to a process in which the GPU accesses the storage space required to be accessed by the GPU task when the GPU task is processed. The parameter affecting the performance of the GPU can be determined according to the access duration corresponding to each access address corresponding to the GPU task. For example, if a duration corresponding to an access duration of the target storage space exceeds an average value of access durations of the access events corresponding to the GPU task, an impact factor affecting the performance of the GPU may be analyzed from an aspect such as a large amount of calculation during access of the GPU to the target storage space, a potentially complex task, or a large amount of access data, or insufficient memory performance.

Optionally, within a time period corresponding to the task start event and the task end event of the GPU task of the GPU, the terminal records access start moments and access end moments of the plurality of storage spaces when the GPU accesses the storage spaces required to be accessed by the GPU task, and determines the access duration corresponding to access to each access address corresponding to the GPU task according to the access start moments and the access end moments.

In step 704, a waiting duration between the GPU task currently created by the CPU and a previous GPU task created previously by the CPU is determined according to the GPU task creation event.

The GPU task creation event may record a generation moment of the current GPU task. The waiting duration between the current GPU task created by the CPU and the previous GPU task may be determined according to generation moments of two temporally adjacent GPU tasks respectively recorded by two temporally adjacent GPU task creation events.

Optionally, the terminal may determine waiting duration between the current GPU task created by the CPU and the previous GPU task according to generation moments of two GPU tasks recorded by two temporally adjacent GPU task creation events.

In step 706, the execution performance reference information of the GPU and/or the CPU for a same GPU task is determined according to the access duration and the waiting duration corresponding to the GPU task.

The access duration corresponding to the GPU task may reflect a performance parameter of the GPU. The waiting duration between the GPU task and the previous GPU task may reflect a performance parameter of the CPU.

In some embodiments, the execution performance reference information of the GPU for the same GPU task is determined if the access duration corresponding to the GPU task exceeds a preset access duration and the waiting duration corresponding to the GPU task does not exceed a preset creation duration.

The fact that the waiting duration corresponding to the GPU task does not exceed a preset creation duration indicates thread performance data of the GPU task created by the CPU is good, and an impact factor affecting the performance parameter of the GPU is in the process of the GPU accessing the storage space. The impact factor may be a factor such as a large amount of calculation during access of the GPU to the target storage space, a potentially complex task, or a large amount of access data, or insufficient memory performance. A corresponding optimization method may be to optimize the graphics application. For example, a graphics format better suitable for processing by the GPU (instead of being better suitable for processing by the CPU) is selected, or data is compressed to reduce transmission time, or the like. If a bottleneck affecting performance of the GPU lies in a specific GPU task, a task algorithm is optimized.

In some embodiments, the execution performance reference information of the CPU for the same GPU task is determined if the access duration corresponding to the GPU task does not exceed the preset access duration and the waiting duration corresponding to the GPU task exceeds the preset creation duration.

The fact that the access duration corresponding to the GPU task does not exceed the preset access duration indicates the performance parameter of the GPU is good, and an impact factor affecting the performance parameter of the GPU is in the process of the CPU creating the GPU task. For example, if the access duration corresponding to the GPU task does not exceed the preset access duration and a waiting duration between two GPU tasks created by the CPU is long, it indicates that there is no factor affecting the performance of the GPU, and the factor affecting the performance of the GPU is due to a fact that a performance parameter for the CPU to create a task cannot meet a requirement of the GPU. A corresponding optimization method is as follows. If there is a dependency between GPU tasks (one task can be executed only after another task is completed), an order of tasks submitted to the GPU can be optimized to reduce waiting time. If there is room for optimization of an application or an operating system, an optimization suggestion may be provided for a partner.

In this embodiment, an entire flow from the CPU creating a GPU task to the GPU executing the GPU task is analyzed, an overall access situation of access to a target storage space by the GPU task is acquired, and a behavior of the entire system is obtained, so as to select an optimal processing manner, which even can change feedback of the graphics driver to requests of the system and the graphics application, thereby changing behaviors of the GPU and the CPU.

In an example, this embodiment relates to multi-thread interaction, because the graphics system often involves many CPU threads using the GPU at the same time. Analyzing interactive behaviors between the multiple threads is an improvement to this embodiment, but for the multi-threaded interaction, there is currently no set of judgment criteria that can be accurately described. For a task that requires multi-threaded collaborative processing, such as a video player, it is actually a pipeline that requires joint cooperation of multiple modules. Performance of each module may affect the overall performance, and the modules may also affect each other. In this case, analysis for performance of a single module is actually very limited. In this case, observed from an overall flowchart, which module is too busy with GPU tasks, or which module is too busy with CPU processing, or which module is waiting for another module can be seen from the pipeline. To facilitate the analysis of the behaviors of the GPU and the CPU, in this embodiment, the GPU task creation event, the access event, the task start event, and the task end event corresponding to each GPU task are drawn in a same flowchart according to a processing time sequence. A horizontal axis of the flow chart indicates the time sequence, and a vertical axis indicates a thread number of the CPU. Specifically, the following steps are included.

In step 1, the GPU task creation event, the access event, the task start event, and the task end event corresponding to each GPU task are sorted in order of processing time, an event sorted first is selected as a current event, and a target thread where the current event is located is selected.

When each event in step 2 is recorded, in addition to recording information of the event, a timestamp when the event occurs and a CPU thread where the event is located are further required to be recorded at the same time. The events are classified according to the CPU threads and then analyzed to generate an interactive relationship between the threads.

It is to be noted that all the events in step 1 are sorted in chronological order, each event is parsed in sequence, and the event is added to an event list of the current CPU thread according to a CPU thread number recorded in the event. If the current event is a creation event of a storage unit, an identifier and detailed information of the storage unit are parsed, and then a correspondence between the identifier and the detailed information is established. The detailed information can be indexed later according to the identifier of the storage unit. The identifier is an access address or a number of the storage unit. The detailed information of the storage unit may be attribute information of the storage unit.

In step 2, if the current event is the access event, a memory access node is added to a corresponding position of the target thread in the flowchart, the memory access node is connected to a last access node in a target storage space corresponding to the access event, and the current memory access node is taken as the last access node in the target storage space; and an access address of the target storage space corresponding to the current event is added to an access event of a last GPU task of the target thread, and next event is selected as the current event.

Figure 8:
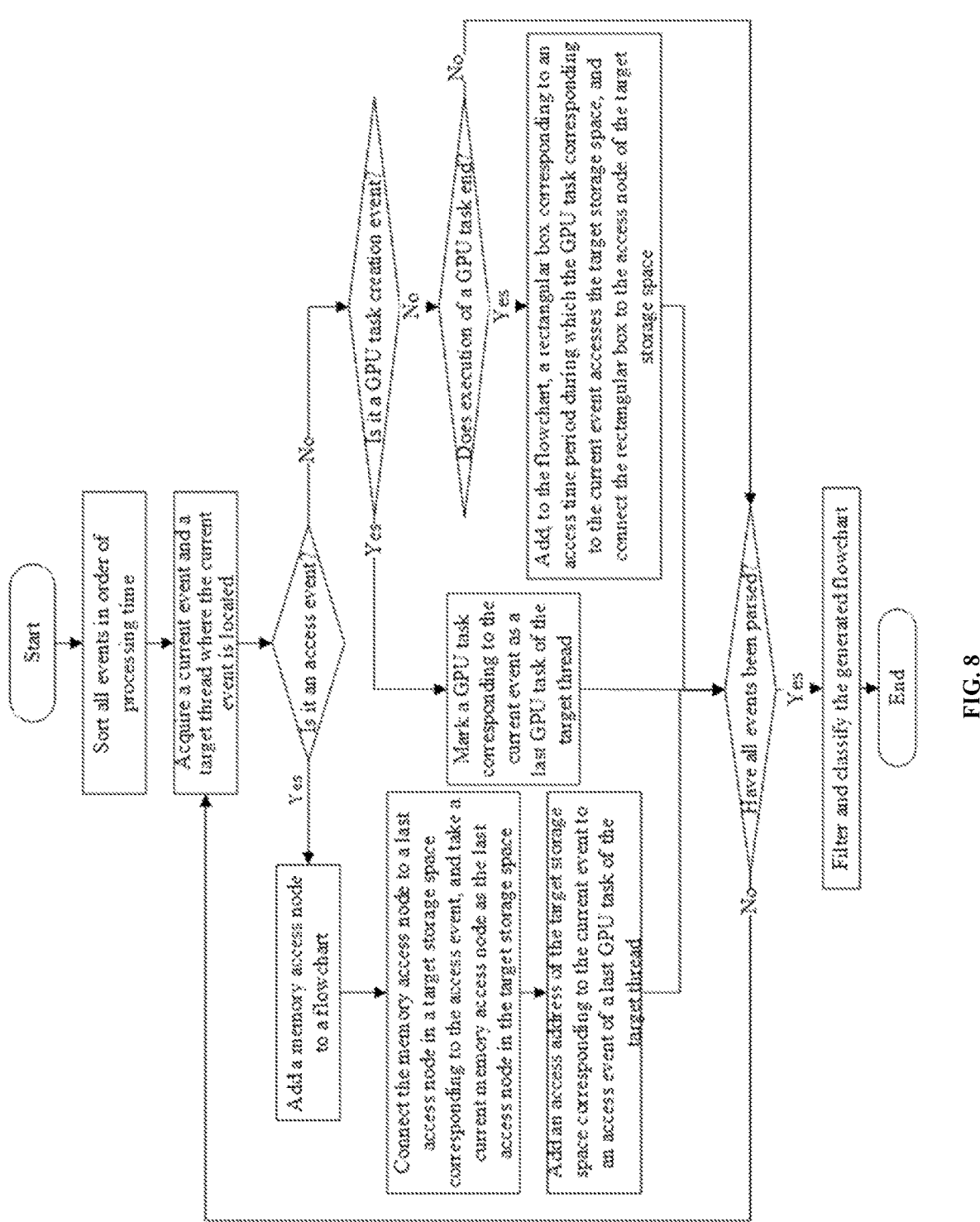
FIG. 8 is a schematic flowchart of creating a flowchart according to an embodiment.

The access node indicates access to the storage space. A creation flow of creating a flowchart is shown in FIG. 8. In this embodiment, the access address of the storage space may be mapped to an address space of the CPU, and the CPU directly reads and writes data stored in the storage space. Whether the GPU accesses the storage space or the CPU accesses the storage space, the operation may be divided into a read operation and a write operation. For example, the GPU displays graphics data in the target storage space on a screen, which is a read operation, and the displayed content corresponds to the last write operation of the target storage space. The CPU thread drawing the content displayed on the screen can be known by associating the last write operation in the target storage space with a screen display node.

It is to be noted that a plurality of events may access a same storage space, but only the identifier of the storage space is required to be recorded during the recording, because at the beginning of trace or when the storage space is created, detailed information of all storage spaces may be recorded and included in the performance data, which can prevent repeated querying and recording of the detailed information of the storage space by the graphics application, reduce extra overhead of recording, and reduce a size of the performance data.

In step 3, if the current event is the GPU task creation event, a GPU task corresponding to the current event is marked as the last GPU task of the target thread, and next event is selected as the current event.

In step 4, if the current event is the task end event, a rectangular box corresponding to an access time period during which the GPU task corresponding to the current event accesses the target storage space is added to the flowchart, the rectangular box is connected to the access node of the target storage space, and next event is selected as the current event.

Figure 9:
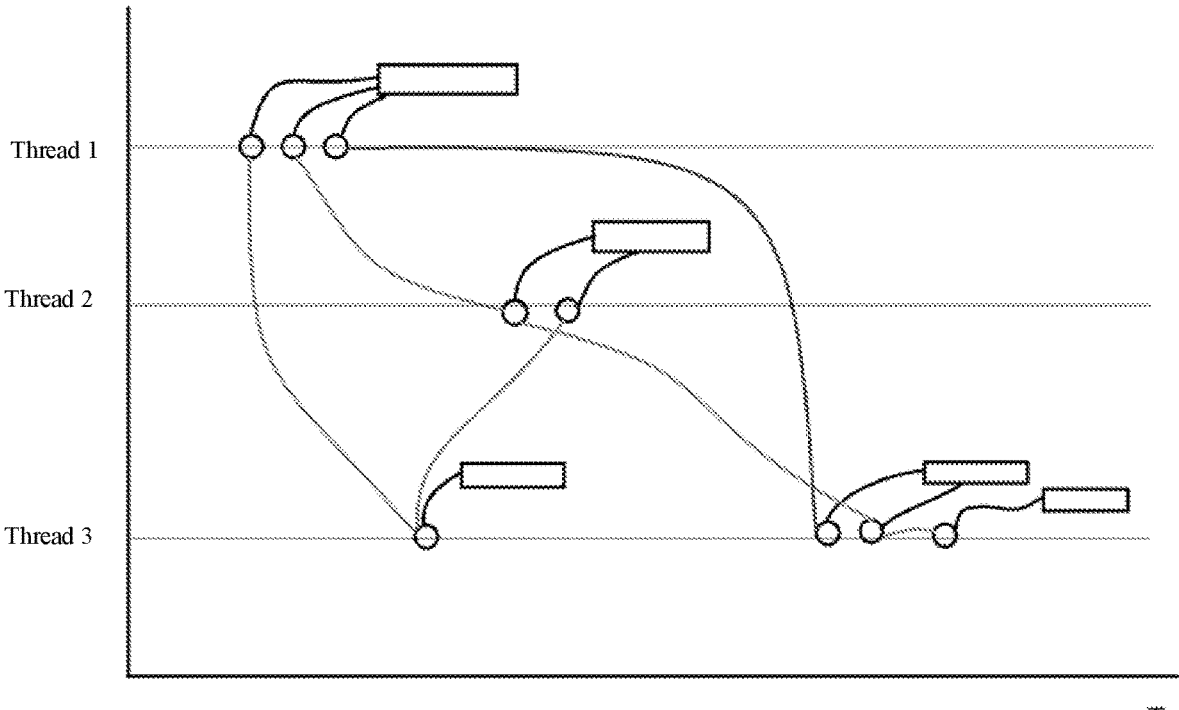
FIG. 9 is a schematic diagram of the flowchart according to an embodiment.

After the GPU ends execution of the GPU task, an access start moment and an access end moment when the GPU accesses the target storage space corresponding to the GPU task can be obtained, and the rectangular box indicating a duration is generated. At the same time, the rectangular box is connected to the access node corresponding to the target storage space. A flow chart drawn after step 1 to step 4 above is shown in FIG. 9. Circles in FIG. 9 represent memories accessed by the GPU task, and squares represent execution time of the GPU task. A GPU task may access a plurality of memories. The CPU may request the GPU multiple times to access a same memory. In this case, a plurality of GPU tasks may be created, but each GPU task may have its own circle. At present, a situation that a plurality of GPU tasks share a circle may not exist. In this embodiment, the created flowchart mainly includes scheduling of the CPU and scheduling information of the GPU. By zooming in and moving, execution of each process and data interaction between the processes may be viewed.

In some embodiments, since an amount of access to the target storage space involved in the graphics system may be very large, a flowchart of the access to the target storage space may also be quite complicated. For the convenience of viewing, after the flowchart of access is created, some optimizations may be performed on the flowchart, including the following optimization schemes.

In order to improve visibility, a line of the read operation is represented in color, a line of the write operation is represented in gray, and access to a same storage space is represented in a same color. If a storage space is only accessed by a certain CPU thread alone, there is no interaction with other CPU threads, and an overall flow may not be affected, so filtering can be performed. If a same storage space has been accessed by two or more threads, it means that there is data interaction between the CPU threads, this type of interaction is classified, and which classifications are to be displayed can be selected.

In this embodiment, access to each storage space in the CPU and the GPU and display of the screen are associated in chronological order, and a flowchart of access to a same storage space can be established, which is convenient for viewing flow directions of the graphics data between the CPU threads as well as task execution and scheduling of the CPU and GPU. Thus, a bottleneck in the entire processing flow can be found by analyzing the processing flow of the GPU graphics data and understanding behaviors of the graphics application and the system service, providing a direction for optimization of the graphics application and the graphics driver.

In an example, the GPU performance analysis method is applied to a typical video player application, and the entire graphics system may involve the following operation flow.

In step 1, a video stream is decoded, and a continuous video image is generated.

Figure 10:
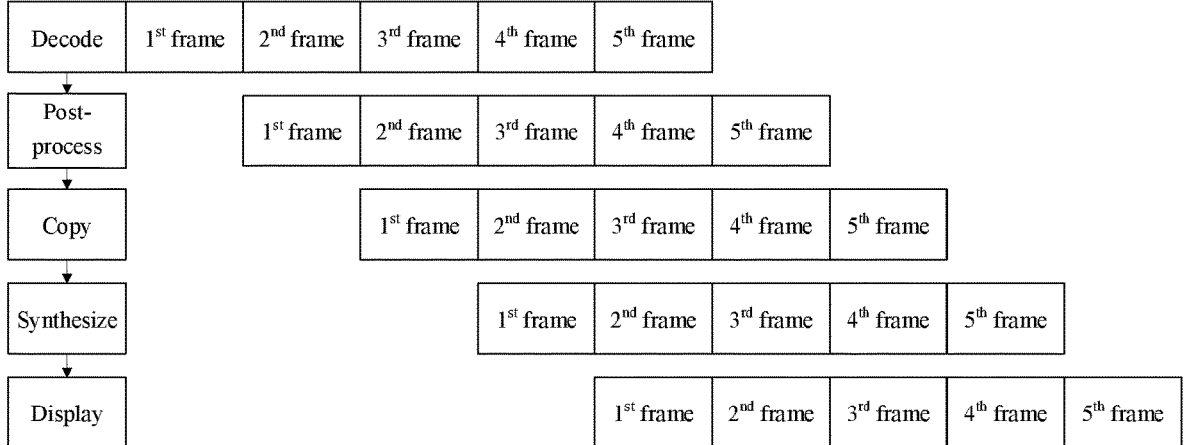
FIG. 10 is a flowchart of video playback processing of a typical video player according to an embodiment.

FIG. 10 shows a video playback processing flow of a typical video player. After the video stream is decoded, a continuous multi-frame video image is generated, and each frame of the video image is marked with a digital label, for example, a $1^{st}$ frame, a $2^{nd}$ frame, . . . , and an $n^{th}$ frame.

In step 2, the video image is post-processed, and the post-processed video image is submitted to a window system service.

The post-processing includes processing such as scaling and a special effect. As shown in FIG. 10, a processing time sequence of the post-processing is later than that of decoding. Therefore, the $1^{st}$ frame of the video image can be post-processed only after the video stream is decoded to obtain the $2^{nd}$ frame of the video image.

In step 3, the window system service chooses to directly display the video image according to a situation, or copy the video image to a video window buffer and submit the video image to a window manager.

In step 4, the window manager draws borders and a title bar for the video window, and synthesizes a plurality of windows to obtain a synthesized image.

In step 5, the window manager sends the synthesized image to a display for display.

It is to be noted that the above decoding, post-processing, copying, synthesis, and displaying operations correspond to different GPU tasks, the GPU tasks are generated by different CPU threads, and the GPU tasks are executed by the GPU. Step 1 to step 5 above are processed by multiple CPU threads and processes. At the same time, each step may involve GPU operations and involve a plurality of modules in the GPU, such as a video decoding module, a video processing module, a 2D copy module, a 3D drawing module, and a display module. As shown in FIG. 10, at a same time, the CPU and the GPU may process a plurality of different video frames in parallel.

A processing flowchart of the video player is created according to the principle of creating a flowchart in the above embodiment. The scheduling information of the CPU and the GPU can be determined according to the processing flowchart of the video player, and decoding, post-processing, copying, synthesis, and displaying of the video frame are intuitively shown in combination with access to GPU data, from which execution of each stage on the CPU and the GPU can be observed respectively.

In an embodiment, a GPU performance analysis method is provided, specifically including the following steps.

In step 1, the plurality of GPU tasks are created according to a plurality of GPU task creation events, and the GPU task queue is formed by the plurality of GPU tasks.

In step 2, a storage space required to be accessed when each GPU task is processed, an access start moment and an access end moment are configured through a GPU access event.

In step 3, the GPU task queue is submitted to the GPU through a GPU task submission event.

In step 4, the GPU task corresponding to a task start event is processed according to the processing time sequence of each GPU task in the task queue through the task start event, and the storage space required to be accessed in the GPU task processing procedure is accessed through the GPU access event.

In step 5, the processing procedure of the GPU task is ended through a task end event.

In step 6, an access duration corresponding to access to each access address corresponding to the GPU task is acquired for the memory access procedure required in the GPU task processing procedure.

In step 7, a waiting duration between the GPU task currently created by the CPU and a previous GPU task created previously by the CPU is determined according to the GPU task creation event.

In step 8, the execution performance reference information of the GPU for the same GPU task is determined if the access duration corresponding to the GPU task exceeds a preset access duration and the waiting duration corresponding to the GPU task does not exceed a preset creation duration.

In step 9, the execution performance reference information of the CPU for the same GPU task is determined if the access duration corresponding to the GPU task does not exceed the preset access duration and the waiting duration corresponding to the GPU task exceeds the preset creation duration.

In this embodiment, the bottleneck in the entire processing flow can be found without source code of the graphics application by analyzing the processing flow of the GPU graphics data and understanding behaviors of the application and the system service, providing a direction for optimization of the graphics application and the graphics driver.

It should be understood that, although the steps in the flowcharts involved in the embodiments as described above are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in the flowcharts involved in the embodiments as described above may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Based on a same inventive concept, an embodiment of the present application further provides a GPU performance analysis apparatus for implementing the GPU performance analysis method as referred to above. The implementation solution to the problem provided by the apparatus is similar to the implementation solution described in the method above. Therefore, the specific limitation in one or more embodiments of the GPU performance analysis apparatus provided below may be obtained with reference to the limitation on the GPU performance analysis method above. Details are not described herein again.

Figure 11:
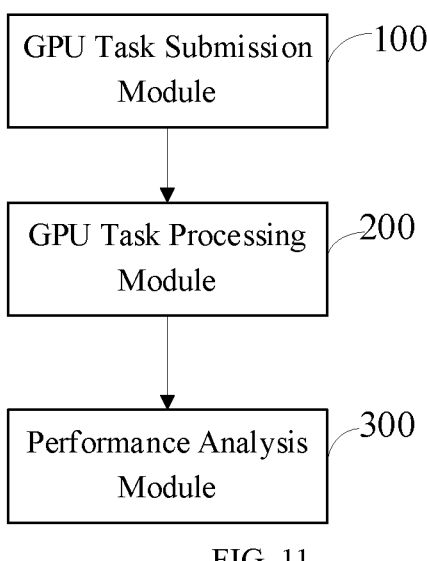
FIG. 11 is a structural block diagram of a GPU performance analysis apparatus according to an embodiment.

In an embodiment, as shown in FIG. 11, a GPU performance analysis apparatus is provided, including: a GPU task submission module 100, a GPU task processing module 200, and a performance analysis module 300.

The GPU task submission module 100 is configured to submit a GPU task queue generated by a CPU to a GPU. The GPU task queue includes a plurality of GPU tasks sorted by processing start moments. Each of the GPU tasks is configured with respective access addresses of a plurality of storage spaces required to be accessed when the GPU task is processed.

The GPU task processing module 200 is configured to process the plurality of GPU tasks through the GPU according to a processing time sequence of each GPU task in the task queue.

The performance analysis module 300 is configured to acquire, for a memory access procedure required in a GPU task processing procedure, execution performance reference information of the GPU and/or the CPU for each GPU task according to access time information generated by the CPU and the GPU for the memory access procedure.

In an embodiment, the GPU task submission module 100 is further configured to create the plurality of GPU tasks according to a plurality of GPU task creation events, and form the GPU task queue according to the plurality of GPU tasks;

configure, through a GPU access event, an access address of a storage space required to be accessed when each GPU task is processed; and submit the GPU task queue to the GPU through a GPU task submission event.

In an embodiment, the GPU task processing module 200 is further configured to process the GPU task corresponding to a task start event according to the processing time sequence of each GPU task in the task queue through the task start event, and access, through the GPU access event, the storage space required to be accessed in the GPU task processing procedure; and end the processing procedure of the GPU task through a task end event.

In an embodiment, the performance analysis module 300 is further configured to acquire, for the memory access procedure required in the GPU task processing procedure, an access duration corresponding to access to each access address corresponding to the GPU task;

determine, according to the GPU task creation event, a waiting duration between the GPU task currently created by the CPU and a previous GPU task created previously by the CPU; and determine the execution performance reference information of the GPU and/or the CPU for a same GPU task according to the access duration and the waiting duration corresponding to the GPU task.

In an embodiment, the performance analysis module 300 is further configured to determine the execution performance reference information of the GPU for the same GPU task if the access duration corresponding to the GPU task exceeds a preset access duration and the waiting duration corresponding to the GPU task does not exceed a preset creation duration; and determine the execution performance reference information of the GPU for the same GPU task if the access duration corresponding to the GPU task does not exceed the preset access duration and the waiting duration corresponding to the GPU task exceeds the preset creation duration.

In an embodiment, the performance analysis module 300 is further configured to draw the GPU task creation event, the access event, the task start event, and the task end event corresponding to each GPU task in a same flowchart according to a processing time sequence. A horizontal axis of the flow chart indicates the time sequence, and a vertical axis indicates a thread number of the CPU.

In an embodiment, the performance analysis module 300 is further configured to sort the GPU task creation event, the access event, the task start event, and the task end event corresponding to each GPU task in order of processing time, and select an event sorted first as a current event and a target thread where the current event is located;

if the current event is the access event, add a memory access node to a corresponding position of the target thread in the flowchart, connect the memory access node to a last access node in a target storage space corresponding to the access event, and take the current memory access node as the last access node in the target storage space; and add an access address of the target storage space corresponding to the current event to an access event of a last GPU task of the target thread, and select next event as the current event;

if the current event is the GPU task creation event, mark a GPU task corresponding to the current event as the last GPU task of the target thread, and select next event as the current event; and if the current event is the task end event, add, to the flowchart, a rectangular box corresponding to an access time period during which the GPU task corresponding to the current event accesses the target storage space, connect the rectangular box to the access node of the target storage space, and select next event as the current event.

The modules in the above GPU performance analysis module can be wholly or partially implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and a diagram of an internal structure thereof may be shown in FIG. 12. The computer device includes a processor, a memory, an input/output interface, a communication interface, a display unit, and an input apparatus. The processor, the memory, and the input/output interface are connected through a system bus. The communication interface, the display unit, and the input apparatus are connected to the system bus through the input/output interface. The processor of the computer device is configured to provide computing and control capabilities. The memory of the computer device includes a non-transitory storage medium and an internal memory. The non-transitory storage medium stores an operating system, a computer program, and a database. The internal memory provides an environment for running of the operating system and the computer program in the non-transitory storage medium. The input/output interface of the computer device is configured to exchange information between the processor and an external device. The communication interface of the computer device is configured to communicate with an external terminal in a wired or wireless manner. The wireless manner may be implemented through WIFI, a mobile cellular network, near field communication (NFC), or another technology. The computer program is executed by the processor to implement a GPU performance analysis method. The display unit of the computer device is configured to form a visually visible picture, which may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 12:
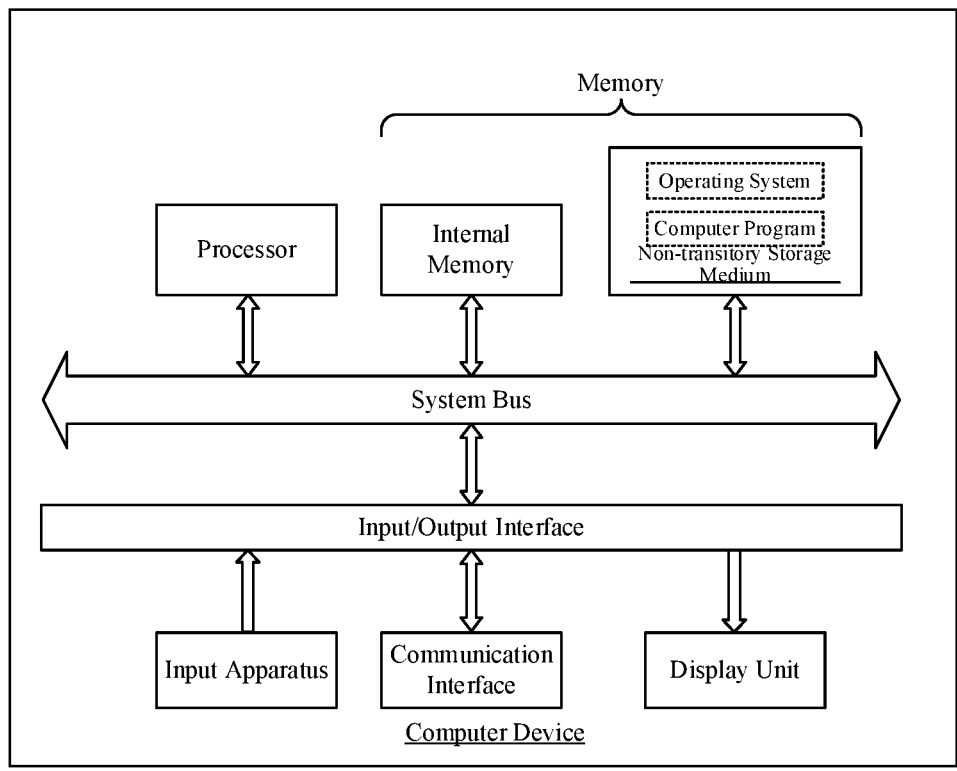
FIG. 12 is a diagram of an internal structure of a computer device according to an embodiment.

Those skilled in the art may understand that, in the structure shown in FIG. 12, only a block diagram of a partial structure related to a solution of the present application is shown, which does not constitute a limitation on the computer device to which the solution of the present application is applied. Specifically, the computer device may include more or fewer components than those shown in the figure, or some components may be combined, or a different component deployment may be used.

In an embodiment, a computer device is provided, including a memory and a processor. The memory stores a computer program. The processor, when executing the computer program, implements the following steps:

submitting a GPU task queue generated by a CPU to a GPU; the GPU task queue including a plurality of GPU tasks sorted by processing start moments, each of the GPU tasks being configured with respective access addresses of a plurality of storage spaces required to be accessed when the GPU task is processed;

processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure.

In an embodiment, the processor, when executing the computer program, further implements the following steps: creating the plurality of GPU tasks according to a plurality of GPU task creation events, and forming the GPU task queue according to the plurality of GPU tasks;

configuring, through a GPU access event, an access address of a storage space required to be accessed when each GPU task is processed; and submitting the GPU task queue to the GPU through a GPU task submission event.

In an embodiment, the processor, when executing the computer program, further implements the following steps: processing the GPU task corresponding to a task start event according to the processing time sequence of each GPU task in the task queue through the task start event, and accessing, through the GPU access event, the storage space required to be accessed in the GPU task processing procedure; and ending the processing procedure of the GPU task through a task end event.

In an embodiment, the processor, when executing the computer program, further implements the following steps: acquiring, for the memory access procedure required in the GPU task processing procedure, an access duration corresponding to access to each access address corresponding to the GPU task;

determining, according to the GPU task creation event, a waiting duration between the GPU task currently created by the CPU and a previous GPU task created previously by the CPU; and determining the execution performance reference information of the GPU and/or the CPU for a same GPU task according to the access duration and the waiting duration corresponding to the GPU task.

In an embodiment, the processor, when executing the computer program, further implements the following steps: determining the execution performance reference information of the GPU for the same GPU task if the access duration corresponding to the GPU task exceeds a preset access duration and the waiting duration corresponding to the GPU task does not exceed a preset creation duration; and determining the execution performance reference information of the GPU for the same GPU task if the access duration corresponding to the GPU task does not exceed the preset access duration and the waiting duration corresponding to the GPU task exceeds the preset creation duration.

In an embodiment, the processor, when executing the computer program, further implements the following step: drawing the GPU task creation event, the access event, the task start event, and the task end event corresponding to each GPU task in a same flowchart according to a processing time sequence; a horizontal axis of the flow chart indicates the time sequence, and a vertical axis indicates a thread number of the CPU.

In an embodiment, the processor, when executing the computer program, further implements the following steps: sorting the GPU task creation event, the access event, the task start event, and the task end event corresponding to each GPU task in order of processing time, and selecting an event sorted first as a current event and a target thread where the current event is located;

if the current event is the access event, adding a memory access node to a corresponding position of the target thread in the flowchart, connecting the memory access node to a last access node in a target storage space corresponding to the access event, and taking the current memory access node as the last access node in the target storage space; and adding an access address of the target storage space corresponding to the current event to an access event of a last GPU task of the target thread, and selecting next event as the current event; if the current event is the GPU task creation event, marking a GPU task corresponding to the current event as the last GPU task of the target thread, and selecting next event as the current event; and if the current event is the task end event, adding, to the flowchart, a rectangular box corresponding to an access time period during which the GPU task corresponding to the current event accesses the target storage space, connecting the rectangular box to the access node of the target storage space, and selecting next event as the current event.

In an embodiment, a computer-readable storage medium is provided, storing a computer program. When the computer program is executed by a processor, steps in the above method embodiments are implemented.

In an embodiment, a computer program product is provided, including a computer program. When the computer program is executed by a processor, steps in the above method embodiments are implemented.

It is to be noted that user information (including, but not limited to, user equipment information, user personal information, and the like) and data (including, but not limited to, data for analysis, stored data, displayed data, and the like) involved in the present application are information and data authorized by the user or fully authorized by all parties, and collection, use, and processing of relevant data are required to comply with relevant laws, regulations, and standards of relevant countries and regions.

Those of ordinary skill in the art may understand that some or all procedures in the methods in the foregoing embodiments may be implemented by a computer program instructing related hardware, the computer program may be stored in a non-transitory computer-readable storage medium, and when the computer program is executed, the flows in the foregoing method embodiments may be implemented. Any reference to the memory, the database, or other media used in the embodiments provided in the present application may include at least one of a non-transitory memory and a transitory memory. The non-transitory memory may include a read-only memory (ROM), a magnetic tape, a floppy disk, a flash memory, an optical memory, a high-density embedded non-transitory memory, a resistive random access memory (ReRAM), a magnetoresistive random access memory (MRAM), a ferroelectric random access memory (FRAM), a phase change memory (PCM), a graphene memory, and the like. The transitory memory may include a random access memory (RAM) or an external cache memory. By way of illustration instead of limitation, the RAM is available in a variety of forms, such as a static RAM (SRAM) or a dynamic RAM (DRAM). The database involved in the embodiments provided in the present application may include at least one of a relational database and a non-relational database. The non-relational database may include a blockchain-based distributed database and the like, but is not limited thereto. The processor involved in the embodiments provided in the present application may be a general-purpose processor, a CPU, a GPU, a digital signal processor, a programmable logic device, a data processing logic device based on quantum computing, and the like, and is not limited thereto.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, and the description thereof is specific and detailed, but cannot therefore be understood as a limitation on the patent scope of the present application. It should be noted that those of ordinary skill in the art may further make variations and improvements without departing from the conception of the present application, and these all fall within the protection scope of the present application. Therefore, the protection scope of the present application should be subject to the appended claims.

What is claimed is:

1. A graphics processing unit (GPU) performance analysis method, comprising: submitting a GPU task queue generated by a central processing unit (CPU) to a GPU; the GPU task queue comprising a plurality of GPU tasks sorted by processing start moments, each of the GPU tasks being configured with respective access addresses of a plurality of storage spaces required to be accessed when the GPU task is processed; processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure;

wherein submitting the GPU task queue generated by the CPU to the GPU comprises: creating the plurality of GPU tasks according to a plurality of GPU task creation events, and forming the GPU task queue according to the plurality of GPU tasks; configuring, through a GPU access event, a storage space required to be accessed when each GPU task is processed, an access start moment and an access end moment; and submitting the GPU task queue to the GPU through a GPU task submission event;

wherein acquiring, for the memory access procedure required in the GPU task processing procedure, execution performance reference information of the GPU and/or the CPU for each GPU task according to access time information comprises: acquiring, for the memory access procedure required in the GPU task processing procedure, an access duration corresponding to access to each access address corresponding to the GPU task; determining, according to the GPU task creation event, a waiting duration between the GPU task currently created by the CPU and a previous GPU task created previously by the CPU; and determining the execution performance reference information of the GPU and/or the CPU for a same GPU task according to the access duration and the waiting duration corresponding to the GPU task.

2. The method according to claim 1, wherein processing the plurality of GPU tasks through the GPU according to the processing time sequence of each GPU task in the task queue comprises: Processing, through the task start event, the GPU task corresponding to a task start event according to the processing time sequence of each GPU task in the task queue, and 33 accessing, through the GPU access event, the storage space required to be accessed in the GPU task processing procedure; and ending the processing procedure of the GPU task through a task end event.

3. The method according to claim 2, wherein drawing the GPU task creation event, the access event, the task start event, and the task end event corresponding to each GPU task in the same flowchart according to the processing time sequence comprises: sorting the GPU task creation event, the access event, the task start event, and the task end event corresponding to each GPU task in order of processing time, and selecting an event sorted first as a current event and a target thread where the current event is located; if the current event is the access event, adding a memory access node to a corresponding position of the target thread in the flowchart, connecting the memory access node to a last access node in a target storage space corresponding to the access event, and taking the current memory access node as the last access node in the target storage space; and adding an access address of the target storage space corresponding to the current event to an access event of a last GPU task of the target thread, and selecting next event as the current event; if the current event is the GPU task creation event, marking a GPU task corresponding to the current event as the last GPU task of the target thread, and selecting next event as the current event; and if the current event is the task end event, adding, to the flowchart, a rectangular box corresponding to an access time period during which the GPU task corresponding to the current event accesses the target storage space, connecting the rectangular box to the access node of the target storage space, and selecting next event as the current event.

4. The method according to claim 1, wherein determining the execution performance reference information of the GPU and/or the CPU for the same GPU task according to the access duration and the waiting duration corresponding to the GPU task comprises: determining the execution performance reference information of the GPU for the same GPU task if the access duration corresponding to the GPU task exceeds a preset access duration and the waiting duration corresponding to the GPU task does not exceed a preset creation duration; and determining the execution performance reference information of the CPU for the same GPU task if the access duration corresponding to the GPU task does not exceed the presetaccess duration and the waiting duration corresponding to the GPU task exceeds the preset creation duration.

5. The method according to claim 1, wherein the method further comprises: drawing the GPU task creation event, the access event, the task start event, and the task end event corresponding to each GPU task in a same flowchart according to a processing time sequence; a horizontal axis of the flow chart indicating the time sequence, and a vertical axis indicating a thread number of the CPU.

6. A computer device, comprising a memory and a processor, the memory storing a computer program, wherein the processor, when executing the computer program, implements the following steps: submitting a graphics processing unit (GPU) task queue generated by a central processing unit (CPU) to a GPU; the GPU task queue comprising a plurality of GPU tasks sorted by processing start moments, each of the GPU tasks being configured with respective access addresses of a plurality of storage spaces required to be accessed when the GPU task is processed; processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure;

wherein submitting the GPU task queue generated by the CPU to the GPU comprises: creating the plurality of GPU tasks according to a plurality of GPU task creation events, and forming the GPU task queue according to the plurality of GPU tasks; configuring, through a GPU access event, a storage space required to be accessed when each GPU task is processed, an access start moment and an access end moment; and submitting the GPU task queue to the GPU through a GPU task submission event;

wherein acquiring, for the memory access procedure required in the GPU task processing procedure, execution performance reference information of the GPU and/or the CPU for each GPU task according to access time information comprises: acquiring, for the memory access procedure required in the GPU task processing procedure, an access duration corresponding to access to each access address corresponding to the GPU task; determining, according to the GPU task creation event, a waiting duration between the GPU task currently created by the CPU and a previous GPU task created previously by the CPU; and determining the execution performance reference information of the GPU and/or the CPU for a same GPU task according to the access duration and the waiting duration corresponding to the GPU task.

7. The computer device of claim 6, wherein processing the plurality of GPU tasks through the GPU according to the processing time sequence of each GPU task in the task queue comprises: processing through the task start event, the GPU task corresponding to a task start event according to the processing time sequence of each GPU task in the task queue, and accessing, through the GPU access event, the storage space required to be accessed in the GPU task processing procedure; and ending the processing procedure of the GPU task through a task end event.

8. The computer device of claim 7, wherein the processor, when executing the computer program, further implements the following steps: drawing the GPU task creation event, the access event, the task start event, and the task end event corresponding to each GPU task in a same flowchart according to a processing time sequence; a horizontal axis of the flow chart indicating the time sequence, and a vertical axis indicating a thread number of the CPU.

9. The computer device of claim 8, wherein drawing the GPU task creation event, the access event, the task start event, and the task end event corresponding to each GPU task in the same flowchart according to the processing time sequence comprises: sorting the GPU task creation event, the access event, the task start event, and the task end event corresponding to each GPU task in order of processing time, and selecting an event sorted first as a current event and a target thread where the current event is located; if the current event is the access event, adding a memory access node to a corresponding position of the target thread in the flowchart, connecting the memory access node to a last access node in a target storage space corresponding to the access event, and taking the current memory access node as the last access node in the target storage space; and adding an access address of the target storage space corresponding to the current event to an access event of a last GPU task of the target thread, and selecting next event as the current event; if the current event is the GPU task creation event, marking a GPU task corresponding to the current event as the last GPU task of the target thread, and selecting next event as the current event; and if the current event is the task end event, adding, to the flowchart, a rectangular box corresponding to an access time period during which the GPU task corresponding to the current event accesses the target storage space, connecting the rectangular box to the access node of the target storage space, and selecting next event as the current event.

10. The computer device of claim 6, wherein determining the execution performance reference information of the GPU and/or the CPU for the same GPU task according to the access duration and the waiting duration corresponding to the GPU task comprises: determining the execution performance reference information of the GPU for the sameGPU task if the access duration corresponding to the GPU task exceeds a preset access duration and the waiting duration corresponding to the GPU task does not exceed a preset creation duration; and determining the execution performance reference information of the CPU for the same GPU task if the access duration corresponding to the GPU task does not exceed the preset access duration and the waiting duration corresponding to the GPU task exceeds the preset creation duration.

11. A non-transitory computer-readable storage medium, storing a computer program, when the computer program is executed by a processor comprising: submitting a GPU task queue generated by a central processing unit (CPU) to a GPU; the GPU task queue comprising a plurality of GPU tasks sorted by processing start moments, each of the GPU tasks being configured with respective access addresses of a plurality of storage spaces required to be accessed when the GPU task is processed; processing the plurality of GPU tasks through the GPU according to a processing time sequence of each GPU task in the task queue; and acquiring, for a memory access procedure required in a GPU task processing procedure, execution performance reference information of the GPU and/or the CPU for each GPU task according to access time information generated by the CPU and the GPU for the memory access procedure;

wherein submitting the GPU task queue generated by the CPU to the GPU comprises: creating the plurality of GPU tasks according to a plurality of GPU task creation events, and forming the GPU task queue according to the plurality of GPU tasks; configuring, through a GPU access event, a storage space required to be accessed when each GPU task is processed, an access start moment and an access end moment; and submitting the GPU task queue to the GPU through a GPU task submission event;

wherein acquiring, for the memory access procedure required in the GPU task processing procedure, execution performance reference information of the GPU and/or the CPU for each GPU task according to access time information comprises: acquiring, for the memory access procedure required in the GPU task processing procedure, an access duration corresponding to access to each access address corresponding to the GPU task; determining, according to the GPU task creation event, a waiting duration between the GPU task currently created by the CPU and a previous GPU task created previously by the CPU; and determining the execution performance reference information of the GPU and/or the CPU for a same GPU task according to the access duration and the waiting duration corresponding to the GPU task.

* * * * *